United States Patent
Chen

(10) Patent No.: US 7,095,845 B2
(45) Date of Patent: Aug. 22, 2006

(54) DUAL HYSTERESIS SIGNAL DETECTION CIRCUIT

(75) Inventor: Meiwen Chen, Hsinchu (TW)

(73) Assignee: Winbond Electronics Corp., Hsinchu (TW)

(*) Notice: Subject to any disclaimer, the term of this patent is extended or adjusted under 35 U.S.C. 154(b) by 347 days.

(21) Appl. No.: 10/078,662

(22) Filed: Feb. 21, 2002

(65) Prior Publication Data

US 2003/0021407 A1   Jan. 30, 2003

(30) Foreign Application Priority Data

Jul. 19, 2001   (TW) ............................... 90117624 A

(51) Int. Cl.
*H04M 1/00*   (2006.01)

(52) U.S. Cl. ................... 379/386; 379/142.01

(58) Field of Classification Search ............... 379/742, 379/372, 386, 373.01, 382
See application file for complete search history.

(56) References Cited

U.S. PATENT DOCUMENTS 4,477,698 A * 10/1984 Szlam et al. ............... 379/377
6,665,397 B1 * 12/2003 Hwang .................. 379/373.01

FOREIGN PATENT DOCUMENTS

TW   379492   * 1/2000

* cited by examiner

Primary Examiner—Sinh Tran
Assistant Examiner—Walter F Briney, III
(74) Attorney, Agent, or Firm—Jianq Chyun IP Office

(57) ABSTRACT

A dual hysteresis signal detection circuit is proposed for detecting a duration of a signal with two hysteresis comparators. There is a first band pass filter for inputting the signal and outputting the signal having a first frequency. A first hysteresis comparator electrically couples to the first band pass filter for comparing with the first frequency of the signal to output a first square wave signal according a first high voltage and a first low voltage. A second hysteresis comparator electrically couples to the first band pass filter for comparing with the first frequency of the signal to output a second square wave signal according to a second high voltage and a second low voltage. A first detection circuit electrically couples to the first hysteresis comparator for detecting a part of the signal having the first frequency that is higher than the first high voltage and lower than the first low voltage to output a first detection signal according to the first square wave signal. A second detection circuit electrically couples to the second hysteresis comparator for detecting a part of the signal having the first frequency that is higher than the second high voltage and lower than the second low voltage to output a second detection signal according to the second square wave signal. The duration of the signal being detected according to the first detection signal and the second detection signal.

15 Claims, 2 Drawing Sheets

| Bellcore SR-TSV-002476 CPE Alerting Signal(CAS) ||
|---|---|
| Frequency Limits | Lower Tone : 2130Hz ± 0.5% |
| | High Tone : 2750Hz ± 0.5% |
| Sound Duration | 75 to 85ms |

Table 1

DUAL HYSTERESIS SIGNAL DETECTION CIRCUIT

FIELD OF THE INVENTION

The present invention is related to a circuit for detecting dual hysteresis signals, and more particularly to a circuit for detecting an input signal duration with an upper hysteresis comparator and a lower hysteresis comparator.

BACKGROUND OF THE INVENTION

In general, when a telephone with a spot dial function is used while a third party is calling the telephone, the telephone company will send a multi-frequency signal to tell the user the spot dial coming. This is the so-called CAS (CPE (Customer Premise Equipment) Alerting Signal) tone. When the telephone circuit detects this signal, an acknowledged signal will be sent to the telephone company. The telephone company may send the telephone number of the third party and relative messages to the user telephone. The CAS tone comprises the multi-frequency signal of 2130 HZ and 2750 HZ. When the caller-ID circuit receives the CAS tone, both the signal frequency and the signal length will be detected. If the frequency and length of the signal meet the specification, the signal may be acknowledged as the signal sent from the telephone company. The Bellcore specification is listed in table 1.

The conventional detection circuit has a damping effect when a CAS tone having large power is received. The effect causes the CAS tone received to be longer than the real CAS tone transmitted, so the CAS tone detection may be incorrect.

For the example of the CAS tone with high frequency 2750 HZ, when the 2750 HZ signal of the input signal is filtered through a band pass filter, the level of "1" or "0" will be decided by a comparator, and such a procedure is the so-called analog to digital conversion. The comparator output is dependent on the hysteresis. The principle is similar to the schmitt trigger. FIG. 1 shows the characteristic curve, wherein Vref is the reference voltage in the analog circuit and the voltage potential from Vth- to Vth+ is the hysteresis value. When the Vi is increased, if Vi>Vth+, Vo="1", and when the Vi is decreased, if Vi<Vth-, Vo="0". The hysteresis value is based on the minimum value acceptable in the telecommunication specification. The signal will be sent to the detection circuit through the hysteresis comparator. The detection circuit consists of counters used to detect the valid input signal according to the signal frequency. If the input signal is valid, the detection circuit outputs CAS_ALGO="1", if not, the CAS_ALGO="0".

FIG. 2 shows the conventional circuit. A short damping effect will appear in case of a large input signal through the band pass filter 21 or 22 after the input signal is ended, but this wrong input signal through the detection of hysteresis comparator 23 or 24 may appear as a valid signal. The larger the signal strength is, the longer the time taken. In speaking of the filter, the calculation time of the digital filter is longer than the analog filter, so the damping effect will be more serious with the digital filter.

SUMMARY OF THE INVENTION

An object of the present invention is to provide two hysteresis comparators for reducing the effect of damping. Another object of the present invention is to cause the CAS tone received to correspond to the real signal length.

According to the present invention, a circuit is proposed for detecting a duration of a signal with two hysteresis comparators. There is a first band pass filter for inputting the input signal and outputting the signal having a first frequency. A first hysteresis comparator electrically couples to the first band pass filter for comparing with the first frequency of the signal to output a first square wave signal according to a first high voltage and a first low voltage. A second hysteresis comparator electrically couples to the first band pass filter for comparing with the first frequency of the signal to output a second square wave signal according to a second high voltage and a second low voltage. A first detection circuit electrically couples to the first hysteresis comparator for detecting a part of the signal having the first frequency that is higher than the first high voltage and lower than the first low voltage to output a first detection signal according to the first square wave signal. A second detection circuit electrically couples the second hysteresis comparator for detecting a part f the signal having the first frequency that is higher than the second high voltage and lower than the second low voltage to output a second detection signal according to the second square wave signal. The duration of the signal is detected according to the first detection signal and the second detection signal.

In accordance with one aspect of the present invention, the signal is a CAS tone.

In accordance with one aspect of the present invention, the first frequency is 2130 HZ.

In accordance with one aspect of the present invention, the first high voltage is higher than the second high voltage.

In accordance with one aspect of the present invention, the first low voltage is lower than the second low voltage.

In accordance with one aspect of the present invention, the second square wave signal appears earlier than the first square wave signal according to the input signal.

In accordance with one aspect of the present invention, the second square wave signal leads the first square wave signal.

In accordance with one aspect of the present invention, the circuit further comprises a second band pass filter for inputting the input signal and outputting the signal having a second frequency; a third hysteresis comparator electrically coupled to the second band pass filter for comparing with the second frequency of the signal to output a fourth square wave signal according to the second high voltage and the second low voltage.

In accordance with one aspect of the present invention, the second frequency is 2750 HZ.

In accordance with one aspect of the present invention, the circuit further comprises a multiplexor electrically coupled to the first detection circuit and the second detection circuit for detecting the duration of the signal according to the first detection signal and the second detection signal.

According to the present invention, a circuit is proposed for detecting a duration of a signal with two hysteresis comparators. There is a band pass filter for handling the signal having a first frequency to output the signal having the first frequency. Two hysteresis comparators electrically couple to the band pass filter for handling the signal having the first frequency and forming a first square wave signal and a second square wave signal. Two detection circuits electrically couple to two hysteresis comparators for forming a first detection signal and a second detection signal according to the first square wave signal and the second square wave signal. A multiplexor electrically couples to the two detection circuits for detecting the duration of the signal according to the first detection signal and the second detection signal.

In accordance with one aspect of the present invention, the signal is a CAS tone.

In accordance with one aspect of the present invention, the first frequency is 2130 HZ.

In accordance with one aspect of the present invention, the second square wave signal appears earlier than the first square wave signal according to the input signal.

In accordance with one aspect of the present invention, the second square wave signal leads the first square wave signal.

In accordance with one aspect of the present invention, the circuit further comprises another band pass filter for handling a second frequency of the signal.

In accordance with one aspect of the present invention, the second frequency is 2750 HZ.

In accordance with one aspect of the present invention, the circuit further comprises two hysteresis comparators electrically coupled to the another band pass filter for forming a third square wave signal and a fourth square wave signal.

The present invention may best be understood through the following description with reference to the accompanying drawings, in which:

BRIEF DESCRIPTION OF THE DRAWINGS

Table 1 is a conventional Bellcore specification table.

DETAILED DESCRIPTION OF THE PREFERRED EMBODIMENT

Figure 3:
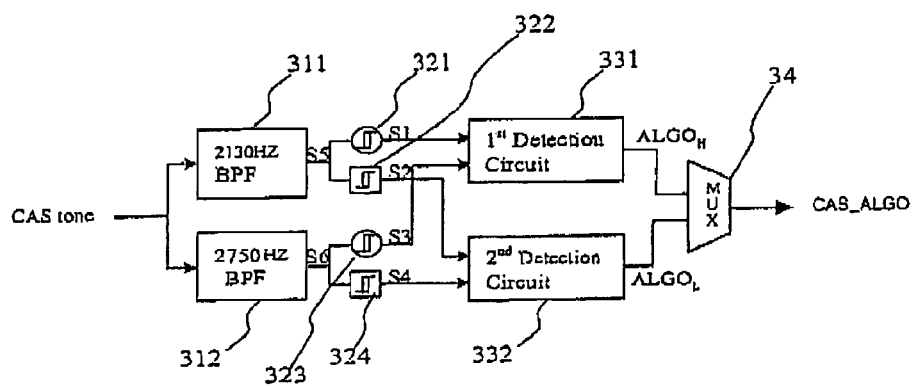
FIG. 3 is the dual hysteresis comparators signal detection circuit block diagram according to the present invention.

Please refer to FIG. 3 showing the dual hysteresis comparators signal detection circuit block diagram. In order to solve the problem caused by damping effect and not to impact the detection sensitivity, two hysteresis comparators (the first hysteresis comparator 321 and the third hysteresis comparator 323) are added to the original circuit having second hysteresis comparator 322, fourth hysteresis comparator 324 and detection circuit 332. Comparing to the conventional circuit, the hysteresis value of the first hysteresis comparator 321 and the third hysteresis comparator 323 is larger than the original. When the damping amplitude is lower than the larger hysteresis value, the signal of the first hysteresis comparator 321 and the third hysteresis comparator 323 will not change, and therefore the detection circuit will detect the CAS tone to be ended. Hereby, the CAS tone length (the duration time) detected will be near the actual length. Wherein, the first hysteresis comparator output is the first square wave signal S1, the second hysteresis comparator output is the second square wave signal S2, the third hysteresis comparator output is the third square wave signal S3, the fourth hysteresis comparator output is the four square wave signal S4, the 2130 HZ band pass filter 311 output is the signal S5 having the first frequency 2130 HZ, and the 2750 HZ band pass filter 312 output is the signal S6 having second frequency 2750 HZ.

Figure 1:
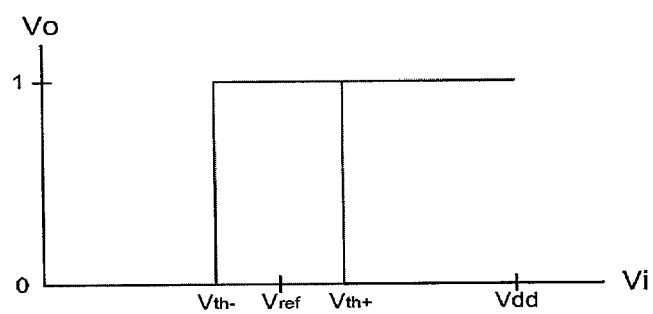
FIG. 1 is a conventional Vi-Vo curve of the hysteresis comparators.
Figure 2:
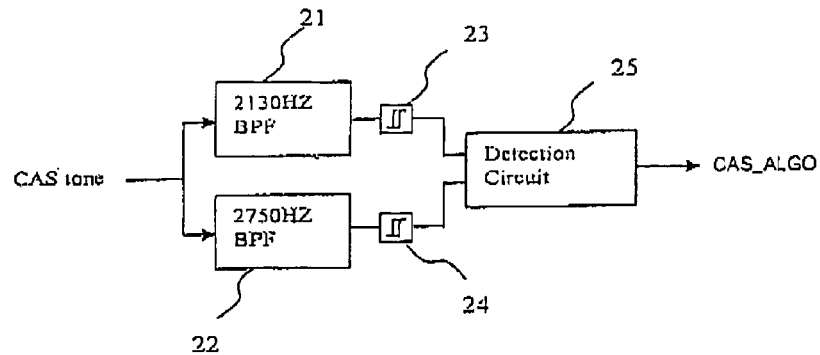
FIG. 2 is a conventional CAS tone detection circuit block diagram.
Figure 4:
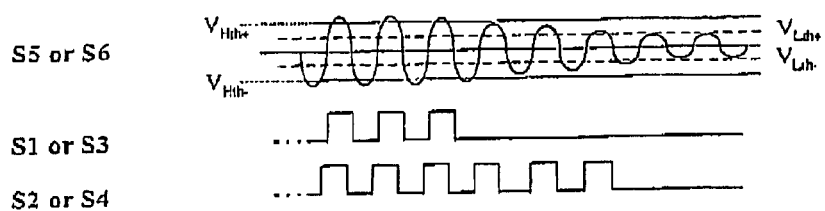
FIG. 4 is the signal waveforms diagram for the input and the output of the dual hysteresis signal detection circuit filter.

FIG. 4 shows the relation between the band pass filter and the hysteresis comparators' output. In the conventional design, the output CAS_ALGO is outputted by the detection circuit 25 (refer to FIG. 2). In our new architecture, the CAS_ALGO is outputted by the multiplexor 34 that can select the first detection circuit 331 with output $ALGO_H$ or the second detection circuit 332 with output $ALGO_L$. When the CAS tone is inputted, the second detection circuit 332 will detect the appearance of the CAS tone earlier than the first detection circuit 331. While when the CAS tone is ended the first detection circuit 331 will detect the disappearance of the CAS tone earlier than the second detection circuit 332. The relations of CAS_ALGO, $ALGO_H$ and $ALGO_L$ is described next.

Case 1

The CAS tone amplitude is more than the upper hysteresis ($V_{Hth+}$ to $V_{Hth-}$), so the first detection circuit 331 and the second detection circuit 332 will calculate out the $ALGO_H$ and $ALGO_L$ respectively. The beginning of CAS_ALGO is dominated by $ALGO_L$ and the ending of CAS_ALGO is dominated by $ALGO_H$.

Case 2

The CAS tone amplitude is between the upper hysteresis and the lower hysteresis ($V_{Lth+}$ to $V_{Lth-}$). Because it is less than the upper hysteresis, the first hysteresis comparator 321 and the third hysteresis comparator 323 output no signal. The first detection circuit 331 is idle and $ALGO_H$ is no signal. Certainly, the CAS_ALGO is dominated by $ALGO_L$.

Generally speaking, the larger the input signal amplitude is, the more obvious the damping effect caused by the filter will be, and the longer the damping time will be also. Anyway, the damping signal power will be decreased more and more. By way of upper hysteresis, most of the damping signal will be cut off. Therefore, the signal detected will not be impacted by the damping effect, and it will not become longer, so the real CAS tone will be acknowledged.

The advance of the present invention is to detect the CAS tone signal exactly. Dual hysteresis comparators are used, the circuit design will be flexible, and it is easy to meet the requirements. The circuit design will be easy to implement by way of adding some modules to the orignal circuit, while the CAS tone detection will be improved. In speaking to the signal required to detect the duration time (ex: DTMF), the dual hysteresis detection can improve the signal detection result with the least modification on the circuit.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circuit for detecting a duration of an input signal, comprising:

a first band pass filter for inputting said input signal and outputting a first signal having a first frequency;

a second band pass filter for inputting said input signal and outputting a second signal having a second frequency;

a first hysteresis comparator electrically coupled to said first band pass filter for comparing with said first frequency of said first signal to output a first square wave signal according to a first high voltage and a first low voltage;

a second hysteresis comparator electrically coupled to said first band pass filter for comparing with said first frequency of said first signal to output a second square wave signal according to a second high voltage and a second low voltage;

a third hysteresis comparator electrically coupled to said second band pass filter for comparing with said second frequency of said second signal to output a third square wave signal according to said first high voltage and said first low voltage:

a fourth hysteresis comparator electrically coupled to said second band pass filter for comparing with said second frequency of said second sianal to output a fourth square wave signal according to said second high voltage and said second low voltage;

a first detection circuit electrically coupled to said first hysteresis comparator and said third hysteresis comparator for detecting a part of said first signal having said first frequency and a part of said second signal having said second frequency that are higher than said first high voltage and lower than said first low voltage to output a first detection signal according to said first square wave signal and said third square wave signal; and a second detection circuit electrically coupled to said second hysteresis comparator and said fourth hysteresis comparator for detecting a part of said signal first having said first frequency and a part of said second signal having said second frecuency that are higher than said second high voltage and lower than said second low voltage to output a second detection signal according to said second square wave signal and said fourth square wave signal; said duration of said input signal being detected according to said first detection signal and said second detection signal.

2. A circuit according to claim 1 wherein said signal is a CAS tone.

3. A circuit according to claim 1 wherein said first frequency is 2130 HZ.

4. A circuit according to claim 1 wherein said first high voltage is higher than said second high voltage.

5. A circuit according to claim 1 wherein said first low voltage is lower than said second low voltage.

6. A circuit according to claim 1 wherein said second square wave signal appears earlier than said first square wave signal according to said input signal.

7. A circuit according to claim 1 wherein said second square wave signal leads said first square wave signal.

8. A circuit according to claim 1 wherein said second frequency is 2750 HZ.

9. A circuit according to claim 1 wherein said circuit further comprises a multiplexer electrically coupled to said first detection circuit and said second detection circuit for detecting said duration of said input signal according to said first detection signal and said second detection signal.

10. A circuit for detecting a duration of an input signal, comprising:

a band pass filter for handling said input signal to output a first signal having a first frequency;

another band pass filter for handling said input sinnal to output a second signal having a second frequency:

two hysteresis comparators electrically coupled to said band pass filter for handling said first signal having said first frequency and forming a first square wave signal and a second square wave signal;

another two hysteresis comparators electrically coupled to said another band pass filter for forming a third square wave signal and a fourth square wave signal;

two detection circuits electrically coupled to said two hysteresis comparators and said another two hysteresis comparators for forming a first detection signal and a second detection signal according to said first square wave signal, said second square wave signal, said third square wave signal and said fourth square wave signal; and a multiplexer electrically coupled to said two detection circuits for detecting said duration of said input signal according to said first detection signal and said second detection signal.

11. A circuit according to claim 10 wherein said signal is a CAS tone.

12. A circuit according to claim 10 wherein said first frequency is 2130 HZ.

13. A circuit according to claim 10 wherein said second square wave signal appears earlier than said first square wave signal according to said input signal.

14. A circuit according to claim 10 wherein said second square wave signal leads said first square wave signal.

15. A circuit according to claim 10, wherein said second frequency is 2750 HZ.

* * * * *